US008102305B2

(12) United States Patent
Otts

(10) Patent No.: US 8,102,305 B2
(45) Date of Patent: Jan. 24, 2012

(54) FILTERING SENSOR DATA TO PROVIDE ESTIMATES OF STRUCTURES

(75) Inventor: Daniel W. Otts, Allen, TX (US)

(73) Assignee: Raytheon Company, Waltham, MA (US)

( * ) Notice: Subject to any disclaimer, the term of this patent is extended or adjusted under 35 U.S.C. 154(b) by 214 days.

(21) Appl. No.: 12/686,862

(22) Filed: Jan. 13, 2010

(65) Prior Publication Data

US 2011/0169683 A1 Jul. 14, 2011

(51) Int. Cl.
*G01S 13/86* (2006.01)
*G01S 13/89* (2006.01)

(52) U.S. Cl. ............... 342/52; 342/53; 342/54; 342/55; 342/179

(58) Field of Classification Search ............ 342/52–55, 342/59, 109–112, 114–116, 179, 191
See application file for complete search history.

(56) References Cited

U.S. PATENT DOCUMENTS

| | | | | |
|---|---|---|---|---|
| 3,982,426 A * | 9/1976 | Newhouse et al. | ............. | 73/610 |
| 4,010,637 A * | 3/1977 | Harwell et al. | ................. | 73/658 |
| 4,132,989 A | 1/1979 | Arens | | |
| 4,148,026 A * | 4/1979 | Gendreu | ......................... | 342/80 |
| 4,389,892 A * | 6/1983 | Niimi et al. | ..................... | 73/586 |
| 4,480,480 A * | 11/1984 | Scott et al. | ...................... | 73/769 |
| 4,573,358 A * | 3/1986 | Luongo | ............................ | 73/660 |
| 5,521,600 A * | 5/1996 | McEwan | ......................... | 342/27 |
| 5,594,807 A | 1/1997 | Liu | | |
| 5,748,003 A * | 5/1998 | Zoughi et al. | ................. | 324/644 |
| 6,426,716 B1 * | 7/2002 | McEwan | ......................... | 342/28 |
| 6,474,166 B1 * | 11/2002 | Osawa et al. | .................... | 73/660 |
| 6,496,187 B1 | 12/2002 | Deering et al. | | |
| 7,868,812 B2 * | 1/2011 | Huthoefer et al. | .............. | 342/28 |
| 2001/0045128 A1 * | 11/2001 | McCall et al. | .................. | 73/511 |
| 2002/0109624 A1 | 8/2002 | Schutz | | |
| 2008/0282817 A1 * | 11/2008 | Breed | .......................... | 73/865.9 |
| 2010/0026550 A1 * | 2/2010 | Rosenbury | ...................... | 342/22 |
| 2010/0060509 A1 | 3/2010 | Chambers | | |

OTHER PUBLICATIONS

Baranoski, Dr. Edward J., "*VisiBuilding: Sensing Through Walls*", Sensor Array & Multichannel Processing, 2006 Fourth IEEE Workshop, 22 pages, Jul. 12, 2006.
Nguyen, Lam, et al., "*Sensing Through the Wall Imaging Using the Army Research Lab Ultra-Wideband Synchronous Impulse Reconstruction(UWB SIRE) Radar*", Proc . . . of SPIE, vol. 6947, pp. B1-B10, 2008.
Chang, Paul C., "*Through-Wall Building Image Improvement Via Signature-Based Clean*", Antennas and Propagation Society, IEEE, 4 pages, Jul. 5, 2008.
Ahmad, Fauzia, et al., "*Multi-location wideband synthetic aperture imaging for urban sensing applications*", ScienceDirect, Journal of the Franklin Institute, vol. 345, pp. 618-639, Sep. 1, 2008.
Baranoski, Edward J., et al., "*Through-wall imaging: Historical perspective and future directions*", ScienceDirect, Journal of the Franklin Institute, vol. 345, pp. 556-569, Sep. 1, 2008.
PCT, Notification of Transmittal of the International Search Report and the Written Opinion of the International Searching Authority, or the Declaration, International Application No. PCT/US2010/052143, 12 pages, Sep. 9, 2011.

* cited by examiner

*Primary Examiner* — John Sotomayor
(74) *Attorney, Agent, or Firm* — Cantor Colburn LLP

(57) ABSTRACT

According to one embodiment, a method comprises receiving sensor data generated by one or more sensors in response to sensing a structure. The sensor data is filtered to identify edge data and reverberation data each describing the same structural feature of the structure. Image data for a filtered image of the structure is generated from the edge data, but not from the reverberation data.

19 Claims, 5 Drawing Sheets

FILTERING SENSOR DATA TO PROVIDE ESTIMATES OF STRUCTURES

GOVERNMENT FUNDING

The U.S. Government may have certain rights in this invention as provided for by the terms of Contract No. W15P7T-08-C-P203 awarded by the Defense Advanced Research Projects Agency.

TECHNICAL FIELD

This invention relates generally to the field of sensor data analysis and more specifically to filtering sensor data to provide estimates of structures.

BACKGROUND

Enforcement, security, and military forces may perform operations in structures such as buildings. These forces may need to know the layout, for example, the floor plan, of the structures. In certain situations, however, the layout may not be available.

SUMMARY OF THE DISCLOSURE

According to one embodiment, a method comprises receiving sensor data generated by one or more sensors in response to sensing a structure. The sensor data is filtered to identify edge data and reverberation data each describing the same structural feature of the structure. Image data for a filtered image of the structure is generated from the edge data, but not from the reverberation data.

Certain embodiments of the invention may provide one or more technical advantages. A technical advantage of one embodiment may be that reverberation data may be filtered out of an image. Filtering out the reverberation data may allow one or more structural features described by the image to be identified more readily.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
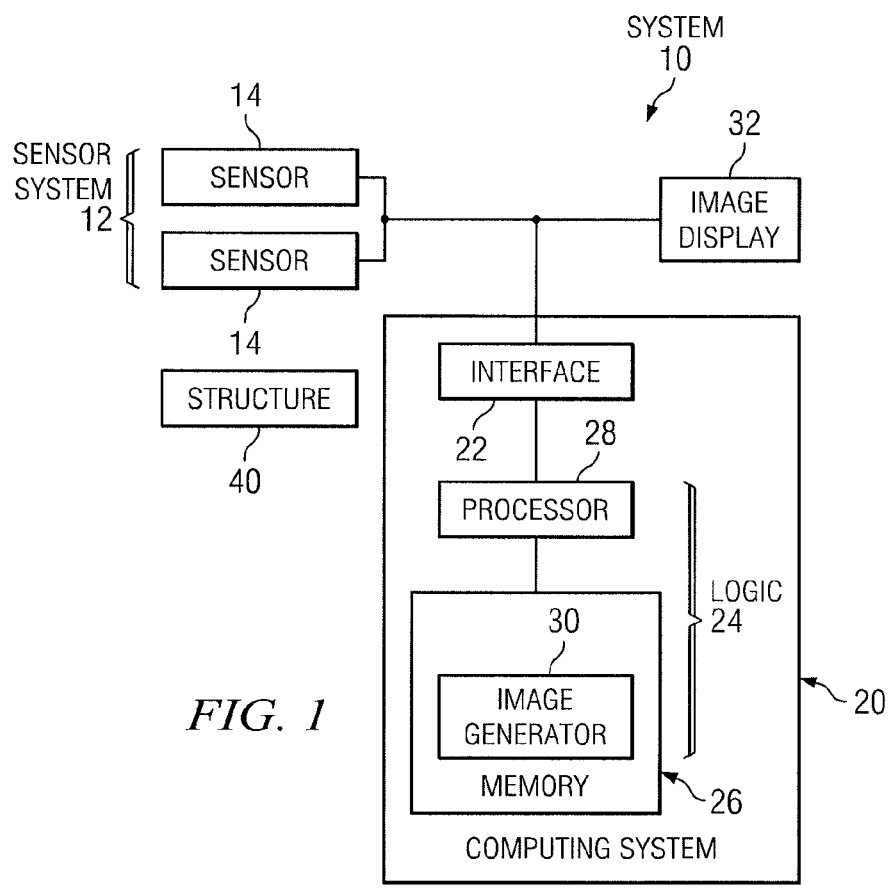
FIG. 1 illustrates one embodiment of a system configured to filter sensor data to provide estimates of structures.

FIG. 1 illustrates one embodiment of a system 10 configured to filter sensor data to provide estimates of one or more structures 40. In the illustrated embodiment, system 10 includes a sensor system 12, a computing system 20, and an image display device 32. Computing system 20 includes an interface 22, logic 24, and memory 26. Logic 24 includes a processor 28 and applications such as an image generator 30. Image display device 32 displays a filtered image.

In certain embodiments, system 10 receives sensor data from one or more sensors 14 of sensor system 12. Sensors 14 may sense a structure 40 and generate an image of structure 40. In the embodiments, system 10 filters the image generated by sensors 14 to yield a filtered image describing structural features of structure 40.

In the illustrated embodiment, structure 40 may be one or more natural and/or manmade physical objects. Examples of structure 40 include buildings such as military, corporate, residential, academic, or medical buildings. In certain embodiments, structure 40 may have structural features that are not visible outside of structure 40. For example, a building may have rooms bordered by walls such that the rooms are not visible outside of the building. The image of structure 40 may describe at least some of these structural features.

Sensors 14 may generate sensor data in response to sensing one or more structures 40. The sensor data may describe the structural features of the structures. Sensor 14 may be any suitable sensing device. Examples of sensor 14 include radar sensors, video cameras, camcorders, closed-circuit television cameras, digital cameras, surveillance cameras, infrared cameras, x-ray cameras, and/or satellite cameras. In certain embodiments, more than one sensor 14 may send data to computing system 20.

Computing system 20 receives sensor data from one or more sensors 14 and filters the sensor data to generate a filtered image of structure 40. Interface 22 receives input, sends output, processes the input and/or output, and/or performs other suitable operation. Interface 22 may comprise hardware and/or software.

Logic 24 performs the operations of the component, for example, executes instructions to generate output from input. In certain embodiments, image generator 30 generates a filtered image of structure 40.

Figure 2:
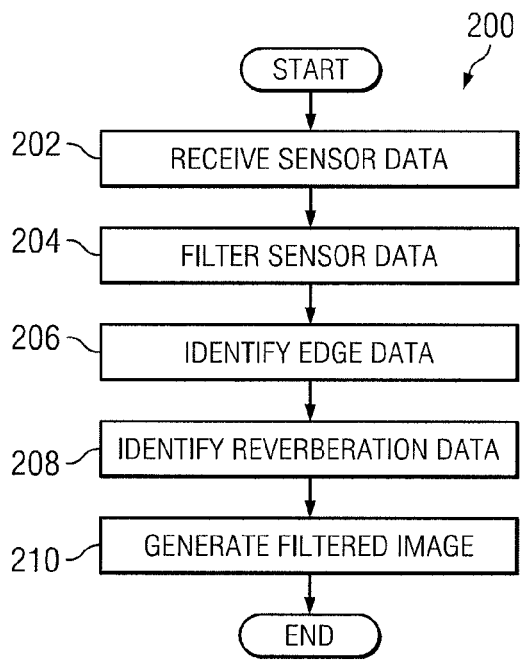
FIG. 2 illustrates an example of a method for filtering sensor data to provide estimates of structures.

FIG. 2 illustrates an example of a method 200 that image generator 30 may use to generate the filtered image. The method 200 begins at step 202 where sensor data may be received from one or more sensors 14. As an example, the sensor data may be received from one or more radar sensors configured to sense electromagnetic waves describing structure 40.

At step 204, the sensor data may be filtered. The filtering may include identifying edge data at step 206 and identifying reverberation data at step 208. In some embodiments, the edge data may comprise a first portion of the sensor data and may describe a structural feature of the structure. The reverberation data may comprise a second portion of the sensor data and may describe the same structural feature as that described by the edge data.

In some embodiments, identifying reverberation data may comprise detecting lower intensity sensor data proximate to higher intensity sensor data. For example, the sensor data may be divided into a plurality of bins arranged according to a perspective of the sensors 14 with respect to the structure 40. Each bin may contain sensor data describing a particular physical area of the structure. Bins describing proximate physical areas may be described as proximate bins. The intensity of the sensor data contained in each bin may be compared to the intensities of the sensor data of other bins located within a predetermined proximity to the bin. The bin may be identified as comprising reverberation data if the intensity is lower than a mathematically-determined intensity calculated from a mathematical function applied to the intensity of one or more proximate bins, such as the mean intensity of the proximate bins. The bin may be identified as comprising edge data if the intensity is greater than or equal to the mathematically-determined intensity.

The predetermined proximity may be determined in any suitable manner. For example, the predetermined proximity may be determined according to a minimum corridor width. In some embodiments, the minimum corridor width may be a width of a typical narrow hallway, such as approximately 0.3-1 meter.

In some embodiments, a guard area may be defined within the predetermined proximity. The guard area may include an area likely to include a portion of a detected structural feature, such as an area selected according to a typical thickness of the target's structural features. For example, a reasonable guard area for a 20 cm thick wall may be about 0.25 meters. In some embodiments, the guard area may be determined according to the spatial down-range resolution of sensor 14. In some embodiments, the intensities of the bins located in the guard area may not be included in the formula that calculates the mathematically-determined intensity.

In some embodiments, a threshold may be used to designate the intensity of a particular bin as higher than that of a proximate bin. For example, the intensity may be designated as greater than that of the proximate bins if it is at least approximately 1 dB greater than a mathematically-determined intensity, such as the mean of the intensity of one or more proximate bins.

At step 210, a filtered image may be generated from data identified as edge data but not from data identified as reverberation data. The method then ends.

Referring back to FIG. 1, Logic 24 may include hardware, software, and/or other logic. Logic 24 may be encoded in one or more tangible media and may perform operations when executed by a computer. Certain logic 24, such as processor 28, may manage the operation of a component. Examples of a processor 28 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 26 stores information and applications such as image generator 30. Memory 26 may comprise one or more tangible, computer-readable, and/or computer-executable storage medium. Examples of memory 26 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Image display device 32 outputs the filtered image generated by computing system 20. Image display device 32 may provide the filtered image in any suitable manner, for example, as a visual display or a printed hard copy. Examples of image display device 32 include a computer display or a printer.

Figure 3:
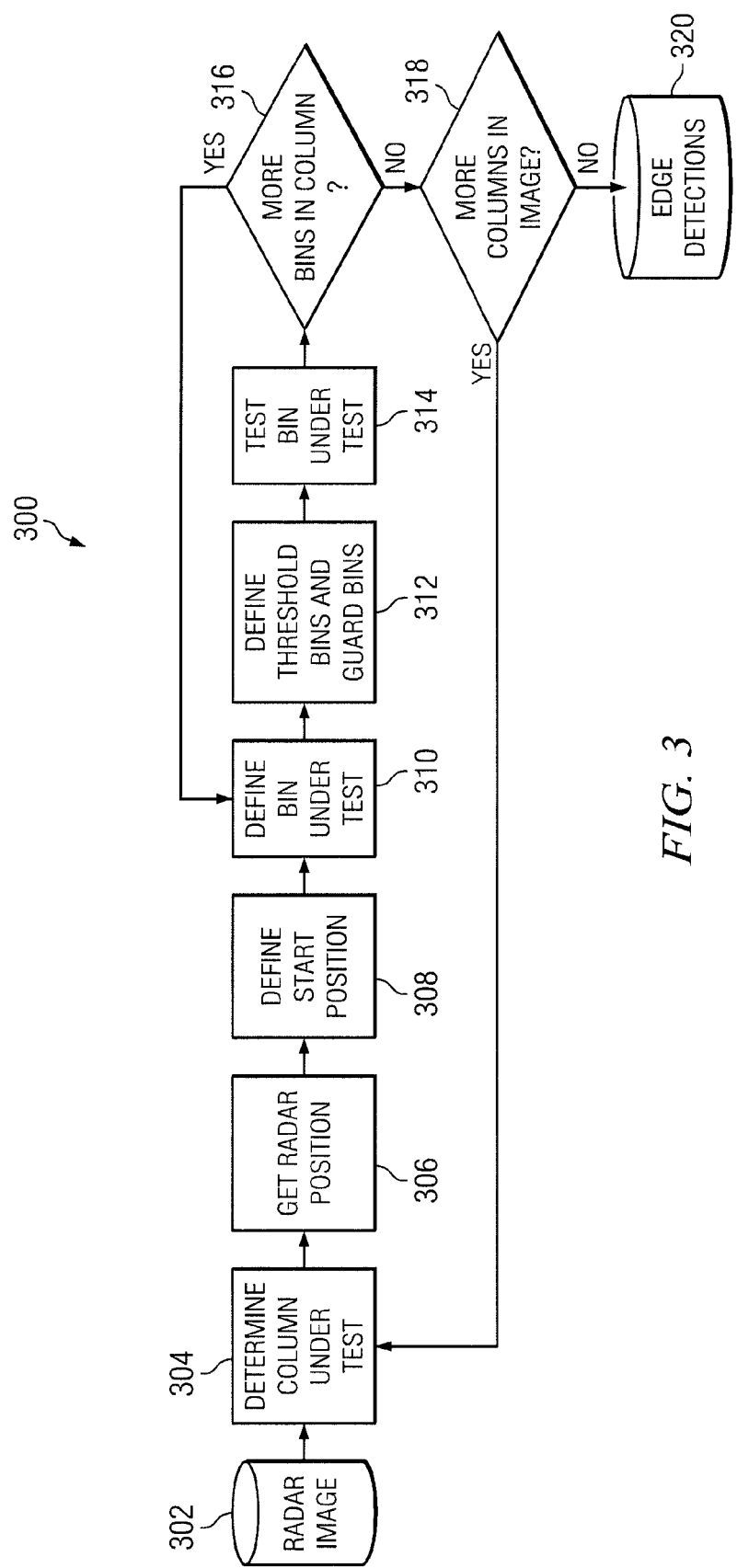
FIG. 3 illustrates an example of a method for identifying edge data and reverberation data for a structural feature.
Figure 4:
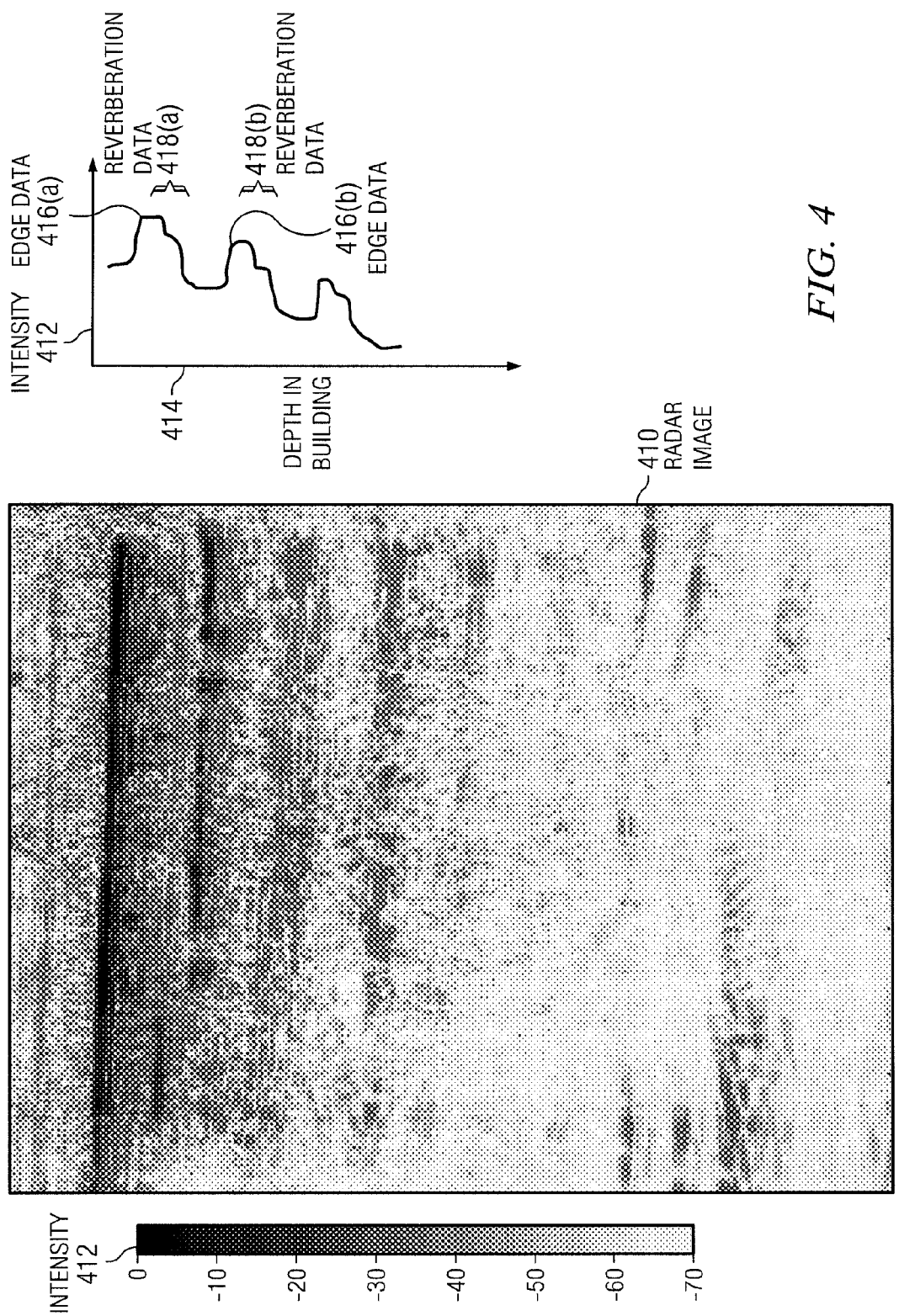
FIG. 4 illustrates an example of a radar image comprising edge data and reverberation data.

FIG. 3 illustrates an example of a method 300 for identifying edge data and reverberation data for a structural feature. The method begins at step 302 where a radar image, such as the radar image 410 of FIG. 4, may be received. In some embodiments, radar image 410 may describe a plurality of electromagnetic waves sensed by sensor 14. Each electromagnetic wave may be characterized by an intensity 412, with higher intensities indicating an increased probability that a structural feature has been sensed.

In some embodiments, sensor data describing a particular structural feature may comprise edge data 416 and reverberation data 418. The edge data 416 may indicate a first instance where the particular structural feature was sensed, and the reverberation data may indicate an echo effect describing the particular structural feature. That is, the reverberation data may be characterized as interference that makes the edge data more difficult to view but fails to provide new information about the location of the structural feature.

In some embodiments, radar image 410 may be generated according to the perspective of the sensor 14. For example, radar image 410 may be arranged according to a depth in building 414. The depth in building may describe the relative distance of the sensed structural feature from the sensor 14. Additionally, for a particular structural feature, the sensor data corresponding to a physical location nearer the sensor may be characterized as edge data 416 and the sensor data corresponding to a physical location further away from the sensor may be characterized as reverberation data 418. In the illustrated example, radar image 410 includes a first structural feature described by edge data 416a and reverberation data 418a, and a second structural feature described by edge data 416a and reverberation data 418b.

Figure 5:
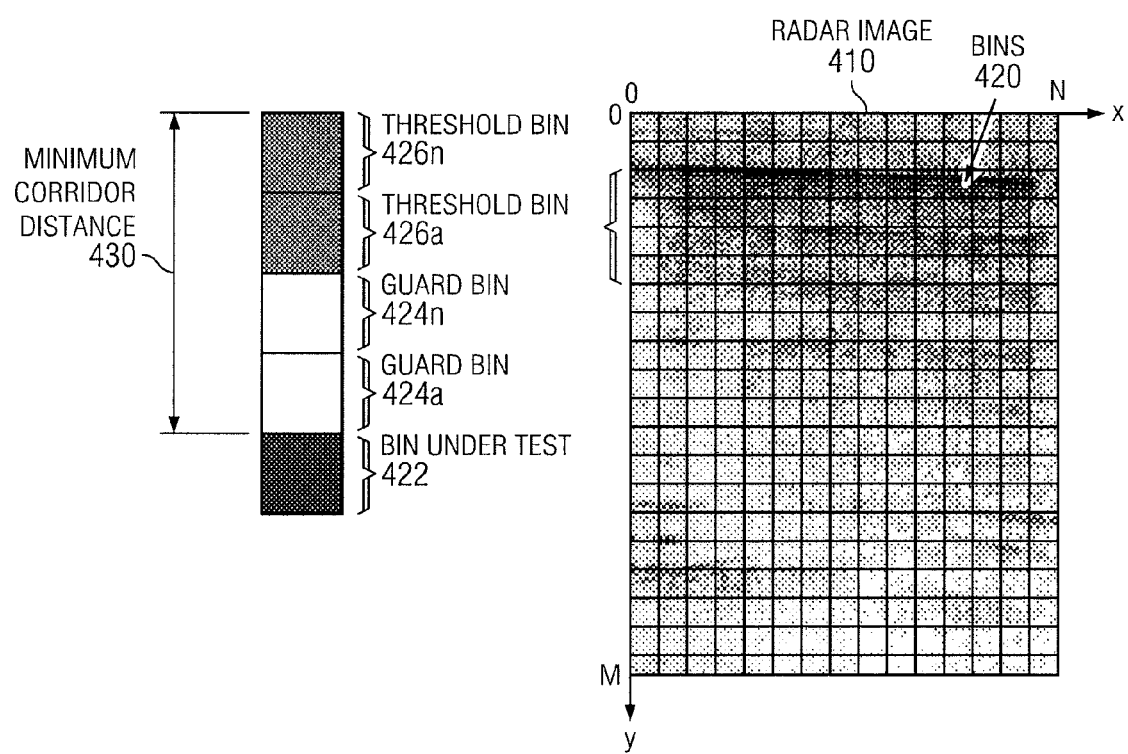
FIG. 5 illustrates an example of a radar image that has been divided into bins.

FIG. 5 illustrates an example of radar image 410 divided into a plurality of bins 420 (not to scale). A bin 420 may comprise, for example, one or more pixels of the radar image 410. The y-axis of radar image 410 represents the relative distance of the sensed structural feature from the sensor 14, the x-axis represents the direction substantially perpendicular to the y-axis. In the illustrated example, the sensor may be located nearer to y=0 and further from y=m. Rows and columns of bins 420 may be formed parallel to the x and y axes respectively.

Returning back to FIG. 3, at step 304, a column under test may be determined. Columns may be tested in any suitable order. As an example, the columns may be tested in the order x=0, 1, 2, and so on.

The radar position most closely aligned with the column under test may be determined at step 306. The radar position may be used to determine a physical location described by the sensor data of the column under test.

The bins 420 may be tested in any suitable order. As an example, the bins 420 may be tested in the order y=0, 1, 2, and so on. At step 308, a start position may be defined. For example, the first bin 420 may be at y=0.

A bin under test 422 may be defined at step 310. In some embodiments, the bin under test 422 may be an untested bin 420 belonging to the column under test. If none of the bins 420 of the column under test have been previously tested, the bin under test 422 may be the bin 420 located in the start position defined in step 308.

At step 312, a number of guard bins 424 and a number of threshold bins 426 may be defined. The guard bins 424 may comprise a number of bins 420 located in the same column as the bin under test 422. The guard bins 424 may describe structural features located closer to the sensor than the structural features described by the bin under test 422. That is, in the example of FIG. 5, if the bin under test 422 is y=i, the guard bins 424 may be y=i−1, i−2, i−3, and so on.

In some embodiments, the number of guard bins may be selected to minimize the likelihood that the threshold bins include structural features of the target. The number of guard bins 424 may be determined according to the spatial resolution of the sensor.

The threshold bins 426 may comprise a number of bins 420 located in the same column as the bin under test 422. The threshold bins 426 may describe structural features located closer to the sensor than the structural features described by the bin under test 422. That is, in the example of FIG. 5, if the bin under test 422 is y=i, the threshold bins 426 may be y=i−1, i−2, i−3, and so on. In some embodiments, the threshold bins 426 may describe features located closer to the sensor than those described by the guard bins 424. As an example, if the bin under test 422 is y=i and the guard bins 424 are y=i−1 and i−2, the threshold bins 426 may be y=i−3, i−4, and so on.

The number of threshold bins 426 may be determined according to a minimum corridor width 430. As an example, the minimum corridor width 430 may describe a width of a typical narrow hallway. Accordingly, high intensity data located within the minimum corridor width 430 of a detected structural feature may be likely to be reverberation data.

In some embodiments, the number of guard bins 424 and/or threshold bins 426 may be decreased according to the location of the bin under test 422 within the column. For example, the bin 420 at position y=0 may not have any other bins preceding it, so the number of guard bins 424 and threshold bins 426 may be set to zero. Alternatively, the number of guard bins 424 and/or threshold bins 426 may be the same for each tested bin, and any bins that are not preceded by the selected number of guard bins 424 and threshold bins 426, such as the bins at position y=0, may not be tested for detections.

The bin under test 422 may be tested at step 314. Any suitable test may be used. For example, the intensity of the bin under test 422 may be compared to a mathematically-determined intensity calculated from the intensity of one or more threshold bins 426. The bin under test 422 may be identified as comprising reverberation data if its intensity is less than the mathematically-determined intensity and edge data if its intensity is greater than or equal to the mathematically-determined intensity.

In some embodiments, a threshold may be used during the intensity comparison. For example, if the intensity of the bin under test 422 exceeds the mathematically-determined intensity by at least a threshold value, the bin under test 422 may be identified as comprising edge data. As an example, the threshold value may be in the range of 0.05-2 dB, such as 1 dB.

At step 316, the method determines whether there are more bins 420 to be tested in the column under test. If there are any bins 420 to be tested, the method returns to step 310 to determine the next bin to test.

If there are no bins 420 to be tested, the method proceeds to step 318 where the method determines whether there are more columns to be tested in the image. If there are any columns to be tested, the method returns to step 304 to determine the next column to test.

Figure 6:
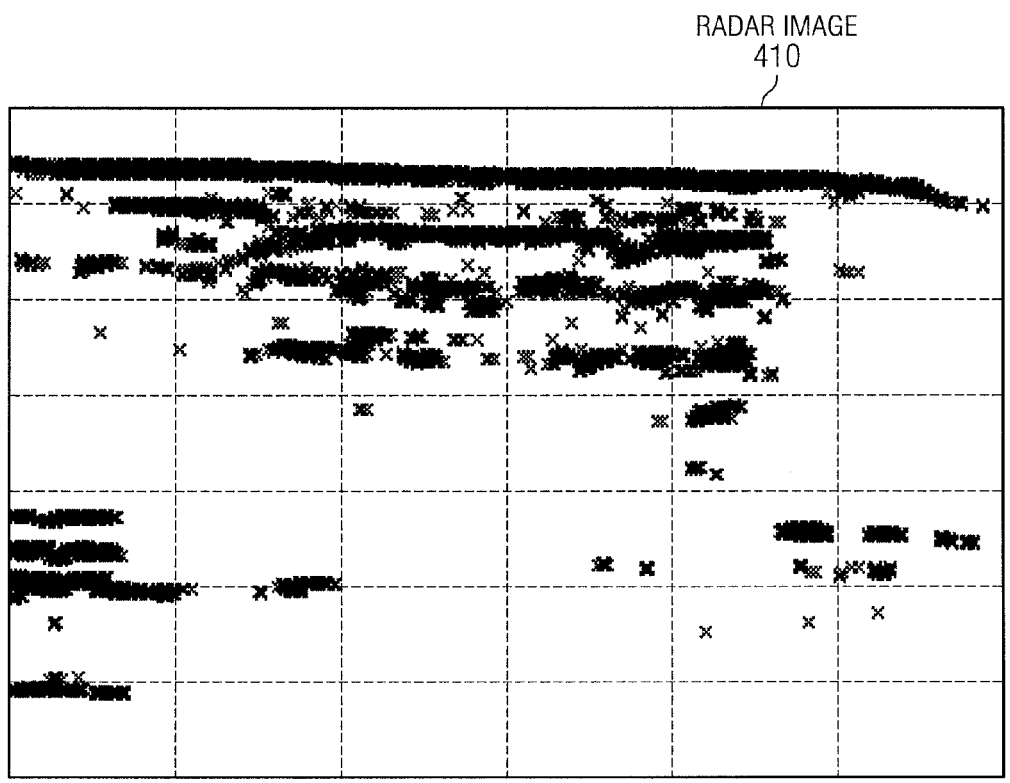
FIG. 6 illustrates another example of a radar image comprising edge data and reverberation data.
Figure 7:
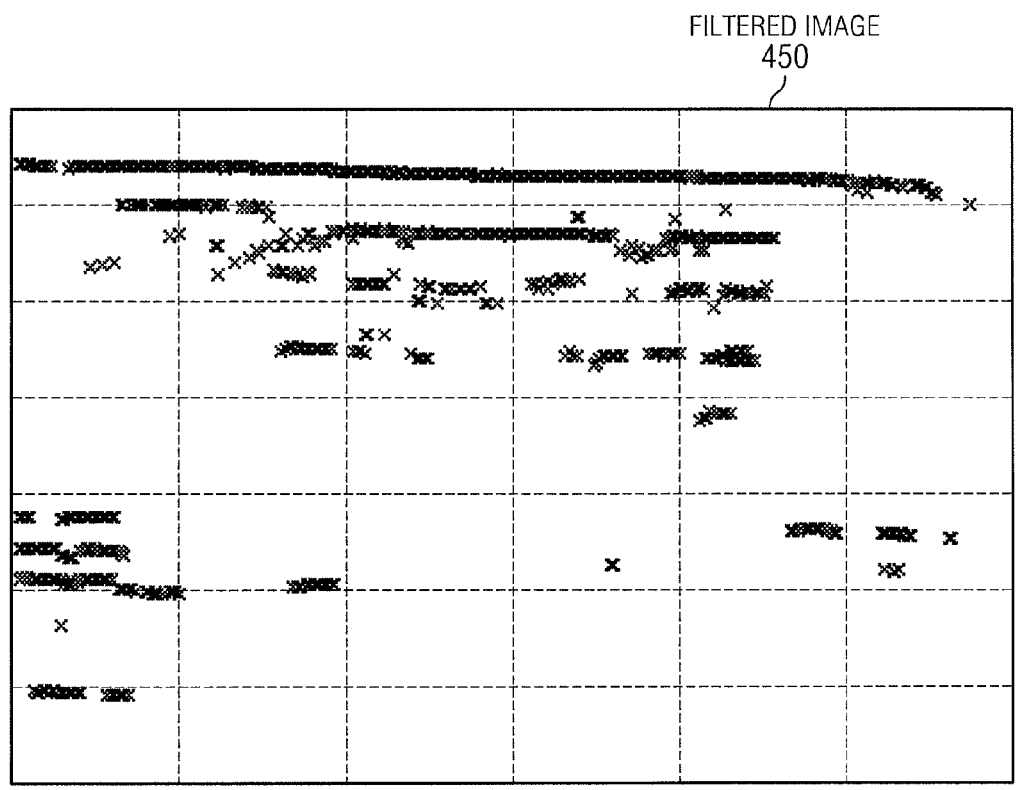
FIG. 7 illustrates an example of a filtered image generated from edge data.

If there are not any columns to be tested the method proceeds to step 320 where an image may be generated from the edge data, but not from the reverberation data. FIG. 6 illustrates an example of an unfiltered radar image 410 that has been generated from edge data and reverberation data. FIG. 7 illustrates an example of a filtered image 450 that may be generated at step 320. The method then ends.

Modifications, additions, or omissions may be made to the methods described without departing from the scope of the invention. The methods may include more, fewer, or other steps. Additionally, steps may be performed in any suitable order.

Figure 8:
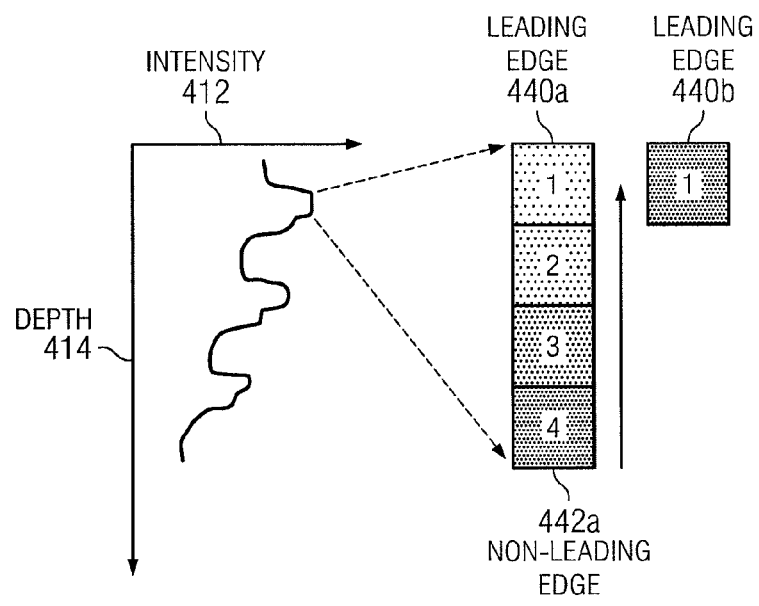
FIG. 8 illustrates an example of increasing the intensity of leading edge sensor data.

FIG. 8 illustrates an example of increasing the intensity of leading edge sensor data. A sensor sensing a particular structural feature generally detects higher intensity data near the sensor and lower intensity data further away from the sensor. In certain situations, however, higher intensity data describing the particular structural feature may occur further away from the sensor. This may cause multiple instances of edge data to be identified for the same structural feature: edge data may be identified upon detecting a first increase in intensity, and reverberation data sensed further away from the sensor may also be identified as edge data upon detecting a second increase in intensity. In some embodiments, the edge detected nearest the sensor may be referred to as a leading edge 440a and the edge detected further away from the sensor may be referred to as a non-leading edge 442a.

In some embodiments, edge data may be detected as non-leading edge data 442a when a guard bin 424 or a threshold bin 426 of the bin under test 422 also comprises edge data (i.e., leading edge data 440a). In some embodiments, the intensity of the leading edge 440a may be increased to a level equal to the intensity of the non-leading edge 442a, as illustrated by leading edge 440b. The intensity of the non-leading edge 442a may then be decreased to filter out the non-leading edge 442a.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. For example, the operations of image generator 30 may be performed by more than one component. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
  receiving sensor data generated by one or more sensors in response to sensing a structure;
  filtering the sensor data, the filtering comprising:

identifying a first portion of the sensor data as edge data, the edge data describing a structural feature of the structure; and identifying a second portion of the sensor data as reverberation data describing the same structural feature as that described by the edge data; and generating image data for a filtered image of the structure from the sensor data, the image data generated from data identified as edge data but not from data identified as reverberation data.

2. The method of claim 1, the identifying a second portion of the sensor data further comprising:

detecting lower intensity sensor data proximate to higher intensity sensor data; and identifying the lower intensity sensor data as reverberation data.

3. The method of claim 1, the filtering further comprising:
dividing the sensor data into a plurality of bins, the plurality of bins arranged according to a perspective of the sensors with respect to the structure; and identifying for each bin of the plurality of bins whether the each bin comprises edge data or reverberation data.

4. The method of claim 1, the filtering further comprising:
dividing the sensor data into a plurality of bins, the plurality of bins arranged according to a perspective of the sensors with respect to the structure;

determining an intensity of each bin of the plurality of bins; and repeating for each bin:
identifying the each bin as a bin under test;
selecting a subset of bins proximate to the bin under test as a plurality of threshold bins;
comparing the intensity of the bin under test to a mathematically-determined intensity, the mathematically-determined intensity calculated based on the intensity of one or more of the threshold bins; and
identifying the bin under test as comprising reverberation data if the intensity of the bin under test is lower than the mathematically-determined intensity.

5. The method of claim 1, the receiving the sensor data further comprising receiving radar sensor data generated by at least one sensor comprising a radar sensor.

6. The method of claim 1, further comprising:
the receiving the sensor data further comprising receiving radar sensor data generated by a sensor configured to sense electromagnetic waves; and the filtering further comprising:
detecting lower intensity sensor data within a predetermined proximity to higher intensity sensor data, the predetermined proximity selected according to one or more reverberation properties of the electromagnetic waves; and
identifying the lower intensity sensor data as reverberation data.

7. The method of claim 1, the filtering further comprising:
detecting lower intensity sensor data within a predetermined proximity to higher intensity sensor data, the predetermined proximity selected based on a minimum corridor width; and identifying the lower intensity sensor data as reverberation data.

8. The method of claim 1, further comprising:
detecting a leading edge of the edge data, the leading edge describing a first portion of a first structural feature;

detecting a non-leading edge of the edge data, the non-leading edge describing a second portion of the same structural feature, the second portion further away from the sensors;

determining that an intensity of the non-leading edge exceeds an intensity of the leading edge;

increasing the intensity of the leading edge to a level equal to the intensity of the non-leading edge; and decreasing the intensity of the non-leading edge to filter out the non-leading edge.

9. A system comprising:
an interface configured to receive sensor data generated by one or more sensors in response to sensing a structure;

a processor configured to filter the sensor data by:
identifying a first portion of the sensor data as edge data, the edge data describing a structural feature of the structure; and
identifying a second portion of the sensor data as reverberation data describing the same structural feature as that described by the edge data; and
generating image data for a filtered image of the structure, the image data generated from sensor data identified as edge data but not from data identified as reverberation data.

10. The system of claim 9, the processor further configured to:
detect lower intensity sensor data proximate to higher intensity sensor data; and identify the lower intensity sensor data as reverberation data.

11. The system of claim 9, the processor further configured to:
divide the sensor data into a plurality of bins, the plurality of bins arranged according to a perspective of the sensors with respect to the structure; and identify for each bin of the plurality of bins whether the each bin comprises edge data or reverberation data.

12. The system of claim 9, the processor further configured to:
divide the sensor data into a plurality of bins, the plurality of bins arranged according to a perspective of the sensors with respect to the structure;

determine an intensity of each bin of the plurality of bins; and repeat for each bin:
identify the each bin as a bin under test;
select a subset of bins proximate to the bin under test as a plurality of threshold bins;
compare the intensity of the bin under test to a mathematically-determined intensity, the mathematically-determined intensity calculated based on the intensity of one or more of the threshold bins; and
identify the bin under test as comprising reverberation data if the intensity of the bin under test is lower than the mathematically-determined intensity.

13. The system of claim 9, the sensor data further comprising radar sensor data generated by at least one sensor comprising a radar sensor.

14. The system of claim 9, further comprising:
the sensor data further comprising radar sensor data generated by a sensor configured to sense electromagnetic waves; and the processor further configured to:
detect lower intensity sensor data within a predetermined proximity to higher intensity sensor data, the predetermined proximity selected according to one or more reverberation properties of the electromagnetic waves; and identify the lower intensity sensor data as reverberation data.

15. The system of claim 9, the processor further configured to:

detect lower intensity sensor data within a predetermined proximity to higher intensity sensor data, the predetermined proximity selected based on a minimum corridor width; and identify the lower intensity sensor data as reverberation data.

16. The system of claim 9, the processor further configured to:

detect a leading edge of the edge data, the leading edge describing a first portion of a first structural feature;

detect a non-leading edge of the edge data, the non-leading edge describing a second portion of the same structural feature, the second portion further away from the sensors;

determine that an intensity of the non-leading edge exceeds an intensity of the leading edge;

increase the intensity of the leading edge to a level equal to the intensity of the non-leading edge; and decrease the intensity of the non-leading edge to filter out the non-leading edge.

17. A method comprising:

receiving radar sensor data generated by one or more sensors configured to sense electromagnetic waves, the electromagnetic waves describing a structure;

filtering the sensor data, the filtering comprising:

identifying a first portion of the sensor data as edge data, the edge data describing a structural feature of the structure; and identifying a second portion of the sensor data as reverberation data describing the same structural feature as that described by the edge data, the reverberation data including:

a subset of lower intensity sensor data within a predetermined proximity to a higher intensity sensor data, the predetermined proximity selected based on a minimum corridor width; and generating image data for a filtered image of the structure from the sensor data, the image data generated from data identified as edge data but not from data identified as reverberation data.

18. The method of claim 17, the minimum corridor width in the range of approximately 0.3 to 1 meter.

19. The method of claim 17, the filtering the sensor data further comprising identifying sensor data as edge data if the intensity of the sensor data is at least approximately 1 dB greater than the mean intensity of sensor data within the predetermined proximity.

* * * * *